May 12, 1936. E. B. CARTER 2,040,166
COIN DETECTING APPARATUS FOR COIN OPERATED TELEPHONES AND THE LIKE
Filed April 2, 1935 6 Sheets-Sheet 1

Inventor
Edward B. Carter
by James R. Hostetter
Attorney

May 12, 1936.   E. B. CARTER   2,040,166
COIN DETECTING APPARATUS FOR COIN OPERATED TELEPHONES AND THE LIKE
Filed April 2, 1935   6 Sheets-Sheet 2

Inventor
Edward B. Carter
by James R. Hodder
Attorney

May 12, 1936.                E. B. CARTER                 2,040,166
COIN DETECTING APPARATUS FOR COIN OPERATED TELEPHONES AND THE LIKE
Filed April 2, 1935                6 Sheets—Sheet 4

Inventor
Edward B. Carter
by James R. Hodder
Attorney May 12, 1936.   E. B. CARTER   2,040,166
COIN DETECTING APPARATUS FOR COIN OPERATED TELEPHONES AND THE LIKE
Filed April 2, 1935   6 Sheets-Sheet 5

Inventor
Edward B. Carter
by James R. Hodder
Attorney

Patented May 12, 1936

2,040,166

UNITED STATES PATENT OFFICE 2,040,166

COIN DETECTING APPARATUS FOR COIN OPERATED TELEPHONES AND THE LIKE

Edward B. Carter, Lexington, Mass.

Application April 2, 1935, Serial No. 14,245

10 Claims. (Cl. 194—97)

My present invention is a novel and improved coin-detecting apparatus or device primarily intended for use with the well-known type of coin-operated telephone; but the invention is also applicable to and useful in similar coin-operated devices, such for example, as coin-admission turnstiles used in subway stations, street railways, elevated stations, amusement parks, or the like.

My invention is directed to provide a suitable coin-detecting apparatus to meet the special and severe requirements to which the above-noted devices are subjected and, therefore, I have designed my coin-detecting means with capacity for instantaneous action, entirely automatic, and utilizing the normal and necessary operations of the device with which it is associated, permitting rapid successive operations as during peak load or rush hour service, and suitable to test, detect, and pass a good coin quickly; as well as to test, detect, and eject an undesirable coin just as quickly.

It is well known that the various coin-testing devices ordinarily used in vending machines, or the like, are entirely unsuited for use with telephone coin-operated boxes or coin-admission turnstiles, these prior devices being entirely too complicated, inefficient, liable to get out of order, slow in operation, as well as being incapable of high-speed successive operations, which is imperative in coin-admission turnstiles during rush hours.

Therefore, in my present development of coin-detecting devices, I have obviated the difficulties heretofore inherent in prior mechanisms of this type, and have devised and developed coin-detecting means primarily intended for use with coin-operated telephones or coin-admission turnstiles.

Furthermore, I have devised an extremely simple, practical, efficient, and inexpensive mechanism, extremely compact and with capacity for high-speed operation, either quickly passing a good coin or just as quickly catching and ejecting an undesirable or spurious coin, and all automatically during the use of the apparatus, particularly coin-operated telephones.

A further important advantage of the present invention is that it may be either attached to telephone coin-controlled boxes now in use, or may be built or incorporated therein as same are made, with equal efficiency and without excess space or constructional difficulties.

In carrying out my present invention in association with coin-operated telephones, I provide means automatically actuated by the normal and necessary operation of the telephone, such for example as the removal and replacing of the receiver on its hook, or by the dialing operation when the latter is employed. Thus, when a call is made by the user in the usual way and during the same time, and without any extra operations being required, the coin-testing devices will be actuated automatically and instantly.

Thus, my automatic coin tester when associated with a coin-operated telephone call box is completely automatic because it is actuated by the necessary and normal operation during use of the telephone. Any and all coins inserted in the various coin slots of the call box must first pass through the testing instrumentalities of my device; good coins are passed instantly and into the proper chute and cash-receiving receptacle of the box. Undesirable or improper coins are instantly and automatically detected, stopped, and held by my coin testing devices and thrown out. The central station operator receives no signal. The user thereby being unable to get his call completed, eventually returns the receiver to the hook; whereupon the undesirable coin is ejected and returned to the user in the return chute, or may be caught in a special receptacle if desired. Thus, no chance of clogging the telephone chute is possible, and the user, where an undesirable coin is returned, will, if he has applied it unwittingly, recognize his error and appreciate that the telephone call cannot be completed until a perfect coin is inserted, and that his failure to complete the call is due to his own error and not through inefficiency of the telephone company, so that he will not be tempted to damage the telephone instrument in a revengeful attitude, as is now often the case.

An important feature of my coin-detecting apparatus is that the passage of a coin trips or operates the various detecting means and simultaneously closes the coin passage against a succeeding coin being pushed in, or a wire or other instrument being used to force through a spurious coin being held therein, or to otherwise damage the device. This feature of guarding the passage against a succeeding coin operates equally when a good coin is passing through as when an undesirable one is held by the detecting devices.

My coin-detecting device or apparatus operates to catch, hold, and discharge any metallic slug, or the usual washer with one or more recesses therein, or a soft metal slug or imitation coin, or a light disc, or indeed, from 95% to 98% of the usual steel, brass, lead, paper, or compound slugs or devices found in coin-operated telephones, turnstiles, or the like at present in use.

Furthermore, my device operates to positively prevent such spurious coins from entering the chutes leading to the cash box and thereby eliminates any possibility of clogging these chutes with these undesirable coins, slugs, etc.

Further novel details, combinations, and advantages will be hereinafter more fully pointed out and claimed.

Referring to the drawings,

Fig. 6 illustrates in cross-section my device with the telephone receiver off the hook and a perfect coin passing through;

Figures 1, 13, 14, 15:
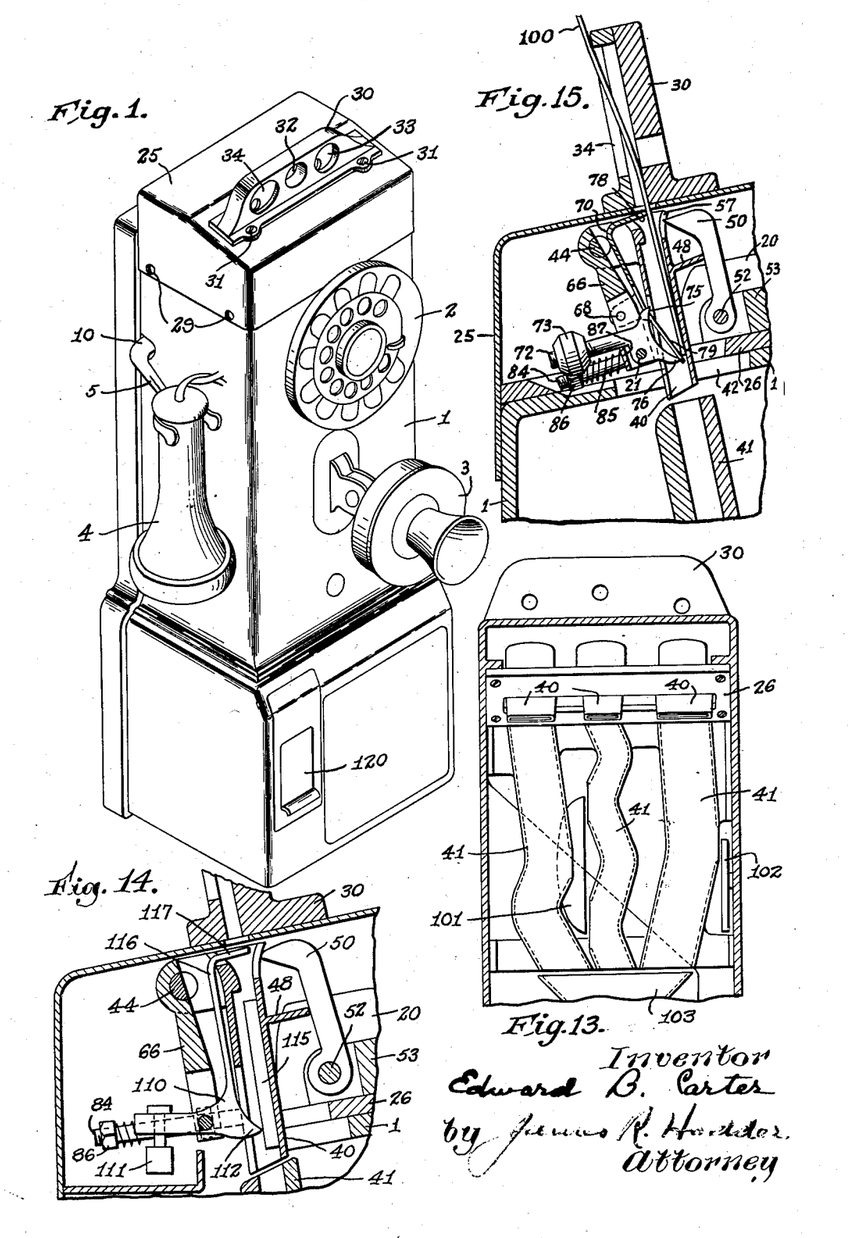
Fig. 1 is a perspective view of a typical type of coin-operated telephone call box with my improved coin-detecting apparatus attached thereto.
Fig. 13 is a fragmentary cross-sectional view illustrating my device as incorporated directly as a part of the telephone box instead of as an attachment.
Fig. 14 illustrates in cross-section a modification and amplification of the trigger and guard arrangement.
Fig. 15 illustrates how the locking guard prevents a foreign object, such as a wire being inserted in the coin chute.

Referring to the drawings illustrating a preferred embodiment of the invention as applied to the well-known and standard type of coin-operated telephone at present in general use, I designates the casing of the telephone box, 2 the dial, 3 the transmitter, and 4 the receiver hung upon the swinging hook 5. This is the usual construction and the hook 5 extends within the box 1, being secured to or integral with a shaft 10 pivotally mounted in lugs 11, and on such shaft is a rocker arm 12 adapted to contact with the bearing lugs 13 and 14 (see Fig. 4). To the upper end of the rocker 12 is a lug 19 in contact with a flat spring 15, which spring is normally overbalanced by the weight of the receiver 4, but when the receiver 4 is lifted from the hook the spring 15 is of sufficient power to lift the hook 5 and move the rocker 12 in contact with the upper lug 14 and closing contact of the members 17 and 18, which complete a circuit and register in the central office.

In the particular form of my invention herein illustrated (except the modifications of Figs. 13, 14, 16, and 17) I have shown my coin-detecting apparatus as a separate unit and adapted for attachment to the casing 1. Therefore, I will now explain my coin-detecting device as illustrated, and then the linkage connection with the lever 5.

Enclosed within a separate box, comprising a cover 25 and base 26, adapted to be attached to the top of the telephone casing 1 my novel and improved coin-detecting devices are fitted, and held by screws 29.

These coin detecting devices comprise a horseshoe magnet 20 secured to the base 26 by a bolt 24 and cross-bar 27 (see Figs. 4 and 11) in convenient position with the poles of the magnet adjacent the tube 40 through the cover 25, thus in alignment with the top plate 30, secured to the cover 25 by screws 31 and having the usual coin-receiving recesses 32, 33, and 34. As shown in the cross-sectional views of Figs. 4 to 10 inclusive, I have designated these cross-sectional views on the line 5—5 of Fig. 3 as showing my coin-detecting mechanism in association with the opening 34, it being understood that under each of the coin-receiving openings are similar devices and separate magnets for each.

Figure 2:
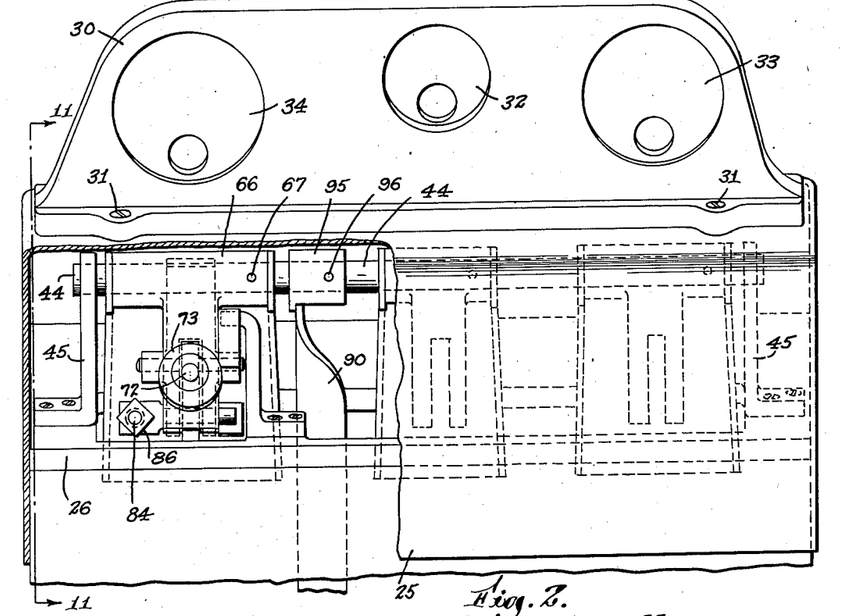
Fig. 2 is a front view on an enlarged scale partly in cross-section.
Figure 3:
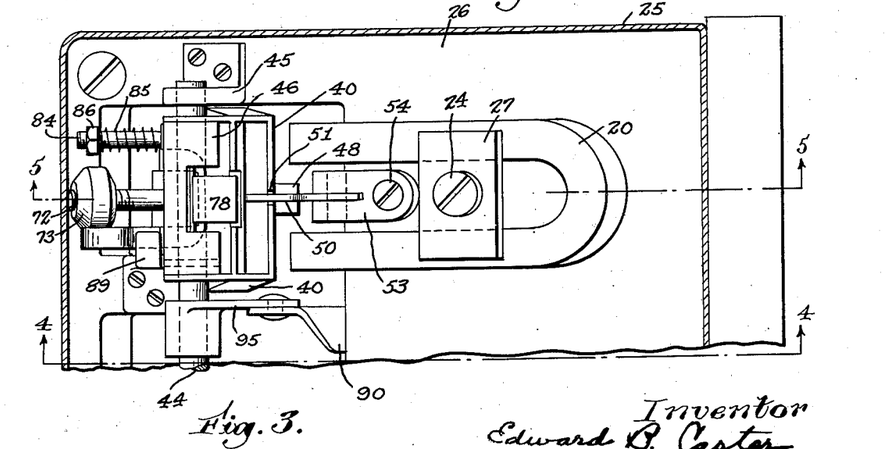
Fig. 3 is a plan view also on an enlarged scale.

My coin-detecting devices comprise a tubular member 40 pivotally attached to a rocker arm 44 supported in bearings in lugs 45 across the width of the telephone casing, as shown in Figs. 2 and 3. The tube 40 is of appropriate width under each of the respective slots 32, 33, and 34 to permit an appropriate coin being fitted within the opening in alignment therewith to pass through the tube 40, said tubes being, further, preferably slightly flaring from the opening at the top to the bottom, so that there will be no tendency for an article to clog or choke the tube. The tube 40 is swung from the arm 44 by the extension 46, and on the opposite side is a projecting lug 48 in position to engage and lift a locking pawl 50 when the tube is swung into alignment from the coin-receiving opening in the plate 30 with the receiving chute 41 of the telephone mechanism.

Figure 8:
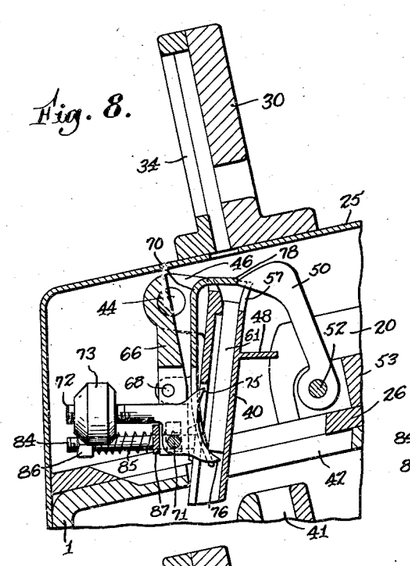
Fig. 8 is a corresponding cross-sectional view showing the position of the coin-detecting devices holding a spurious coin when the hook is "wiggled" or the receiver is partly returned to the hook and the spurious coin, whether light or magnetic, has been moved out of alignment with the coin chute but has not yet been released since the receiver is not completely returned to the hook.
Figure 9:
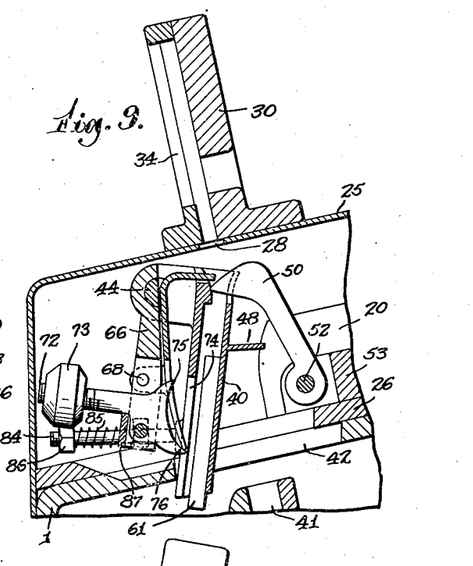
Fig. 9 is a corresponding cross-sectional view after the receiver is returned to its hook and the triggers are completely withdrawn from engagement with the spurious coin, which is dropping to the return receptacle.
Figure 11:
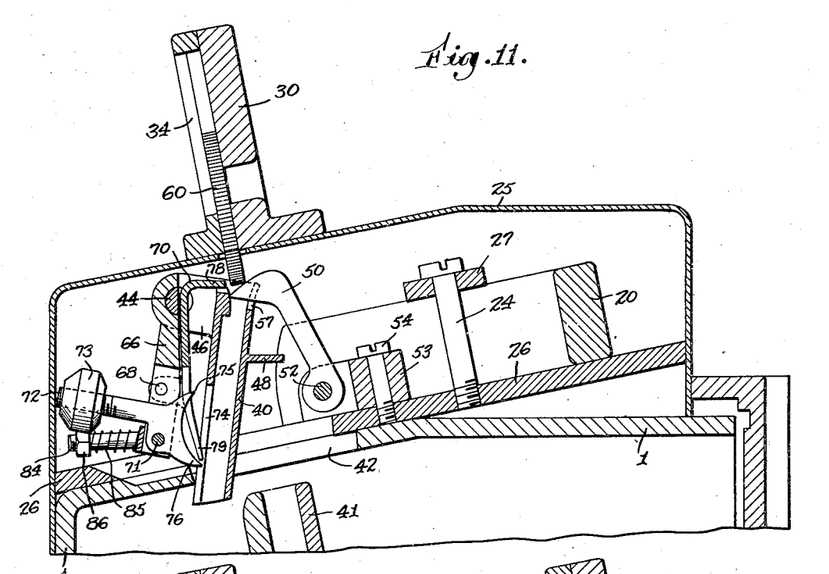
Fig. 11 is a cross-sectional view on the line 5—5 of Fig. 3 with the device at rest, as in Fig. 4, and with a coin inserted before the telephone receiver has been lifted from the hook.
Figure 12:
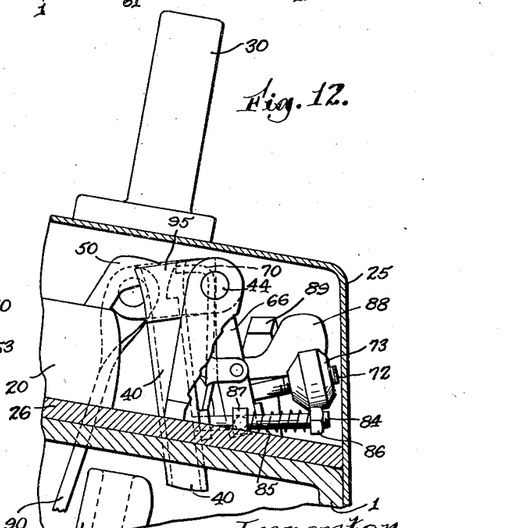
Fig. 12 is a reverse view of the device from that shown in Fig. 10.

This pawl 50 is normally pivoted at 52 between a forked member 53 held by a bolt 54 threaded into the base 26, said pawl 50 normally falling forwardly or into the position shown in Figs. 8, 9, and 11 by gravity, projecting through a slot 57 in the adjacent wall of the tube 40 so that said pawl will close the tube 40 against the entrance of a coin, as shown at 60, Fig. 11, if the coin is fitted within the opening 34 before the user lifts the receiver 4 from the hook 5.

Also mounted on the rod or rocker arm 44 is a web 66, which web is keyed or held rigidly with the rocker arm 44 by a set screw 67, see Fig. 2. The web 66 depends from the arm or rod 44 and carries at its lower end on a pin 68 a rearwardly extending lug integral with the locking lever 70, having its upper end 78 adapted to extend across the top of the tube 40, and its lower end 79 bent to extend into the tube 40 through a slot 74 in the bottom of the tube. Also mounted on the lower part of the web 66 on a pivot pin 71 is the detecting and trigger member 72, having points 76 and 75 also extending through the slot 74 in the tube 40 and in position to be struck or engaged by any article coming through the tube, the tension of these points being adjustably attained by the movement of a weight 73 threaded onto the shaft of the detecting and trigger member 72 and adapted for rotative movement thereon to secure any desired extent of counterbalancing action which may be desired. Attached to the lever 70 is a weight 88 normally tending to swing the locking lever 70 away from the tube 40, or to the left viewed in Fig. 4, a fixed stop 89 being in position to limit the forward movement.

Secured to the tube 40 is an extending rod 84 having an encircling spring 85 carried thereby and bearing between an adjustable nut 86 and a cross-piece 87 which extends from the web 66. Consequently, the tube 40 and web 66 and its associated trigger and locking members are yieldingly moved by the spring 85 and an adjustment for tension is afforded by a manipulation of the nut 86. Manipulation of the weight 73 also permits the same mechanism to be utilized but suitably adjusted for operation on a nickel, dime, or quarter so that my mechanism can be interchangeably used and adjusted for the weight of any coin to be operated on.

Figure 6:
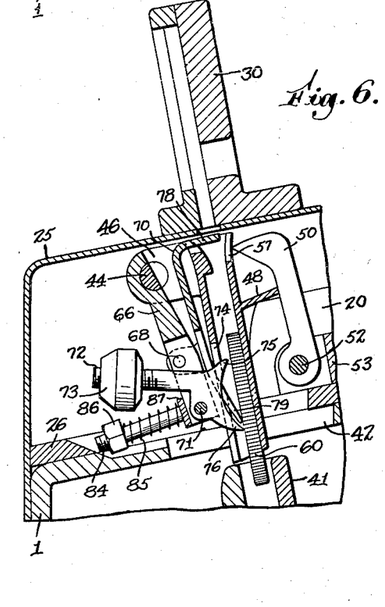

As it is desired to have a genuine coin go through the detecting devices and the tube 40 quickly, the weight 73 and spring 85 are properly adjusted to permit a good coin (diametrically illustrated at 60, Figs. 6 and 11) to pass through the tube 40 quickly, tripping the point 76 and the lower end 79, which latter moves the locking lever 78 into position, closing the tube 40 against the insertion of another coin or instrument until the coin 60 has passed into the chute 41. The tube 40 is moved into and out of alignment with the telephone chute 41, and my coin-detecting devices are arranged to be tripped and to permit a coin of proper weight to be passed quickly therethrough and into the chute 41; whereas an improper coin will be caught and held within the tube 40 until the tube 40 is moved out of alignment with the chute 41 and then the spurious or undesirable coin is released.

For this purpose and to lock the tube and its associated parts into and out of alignment and position where the same is to be operated by the raising and lowering of the receiver 4, I use a link 90 and connect same through a pivot 91 on an arm 92 attached to the lug 93 keyed or otherwise secured to the rocker arm 10, which is moved upwardly and downwardly by the hook 5 due to the removing and replacing of the receiver 4 so that said link 90 will be moved upwardly and downwardly, the upper end of said link being attached to an extension 95, having a hub extending around the rocker arm 44 and keyed thereto at 96. Consequently, with the mechanism at rest, as shown for example in Fig. 4, the tube 40 is swung out of alignment with the chute 41 and held in this position until the receiver 4 is lifted.

Meanwhile, if a coin 60 is fitted within the receptacle 34, it will drop downwardly through the recess 28 and strike against the top of the locking pawl 50 (see Fig. 11) and be held there until the user lifts the receiver 4 from the hook 5. Thereupon, the spring 15 will swing the rocker 12 simultaneously moving the link 90 upwardly, which, in turn, oscillates the shaft 44 appropriately to swing the tube 40 into vertical alignment between the coin-opening slot in the plate 30 and the coin-receiving chute 41 in the telephone. Preferably the chute 40 will be also moved into direct contact with the opposite poles of the horseshoe magnet 20, and this action causes the lug 48 to strike against the pawl 50, lifting the point of the same from closing the upper end of the tube 40 and moving it out of the slot 57, permitting the tube 40 to be in open communication and alignment with the coin-receiving recess 34 and chute 41.

Figure 5:
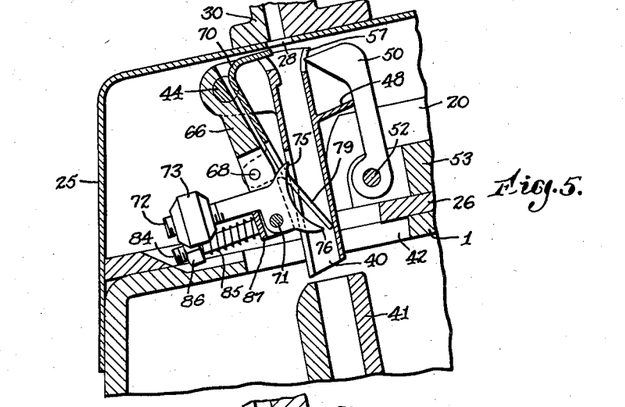
Fig. 5 illustrates in cross-section the position of the detecting devices after the telephone receiver has been lifted from the hook and the coin-detecting means are in position to receive a coin.

If a coin 60 has already been placed in the recess 34, it will not drop into the chute 40. However, if the user first lifts the receiver 4 off its hook, then the parts will assume the position just described, and as shown in Fig. 5, with the pawl 50 out of the way and the tripping points 76 and 79 forced yieldingly into the bottom of the tube 40 by the spring 85 through the slot 74. Thereupon, the coin 60 if applied beforehand, as shown in Fig. 11, or if now applied will drop through the chute 40 striking the tripping portion 79 of the locking lever 70, throwing the upper part 78 of the locking lever 70 across the top of the tube 40, preventing any succeeding coin being applied. Continued movement of the coin 60 will strike the point 76, which, if the coin 60 is of proper weight to which the weight 73 has been adjusted, it will pass quickly therethrough and into the chute 41.

Figure 7:
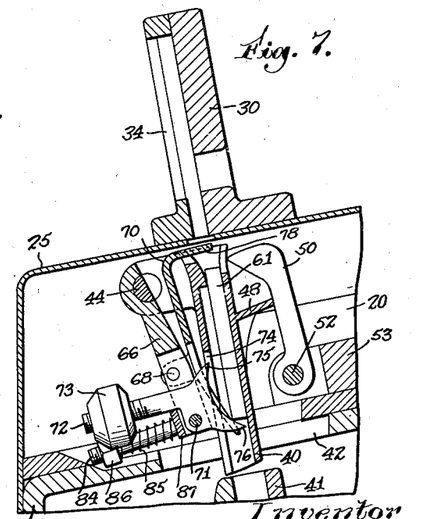
Fig. 7 is a corresponding view illustrating a spurious coin failing to pass through and being caught and held.
Figure 10:
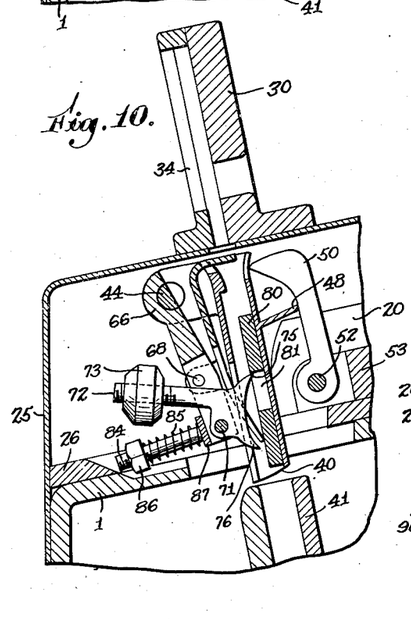
Fig. 10 illustrates how a washer is caught and held.

But if the coin is an undesirable or spurious one, as shown at 61, Figs. 7, 8, and 9, and is not of proper weight to trip the weighted member 72, or if it is of too great a thickness, it will cause the top points 75 to impinge thereagainst. Or if it has an opening or recess, like the coin 80, shown at 81 in Fig. 10 (the usual construction of lead slugs) the upper point 75 will catch therein and hold the spurious coin.

Furthermore, if the coin 61 is magnetic, the magnet 20 will attract the same sufficiently to alter its weight and make it enough lighter so that it will not trip the weight 73 and, hence, will be held in the chute 40. Or, if the spurious coin is of soft material, lead, or the like, the point 75 will impinge thereagainst and hold the same, preventing the free passage of the undesirable coin into the chute 41. In case of a paperboard slug, it will not trip the trigger 72, but will only throw the locking guard 78 into position.

It is usually found that slugs, if of proper weight to correspond with that of a genuine coin, contain sufficient magnetic element so that the magnet 20 will operate effectively to reduce the weight and hold them. Or if the slugs are overweight, they may have openings or center recesses, such as that shown at 80, and thus be caught and held. Tobacco tags are utilized and these are of metal, which the magnet would tend to hold against the walls of the tube 40 and thus prevent the same from passing into the chute 41.

Figure 4:
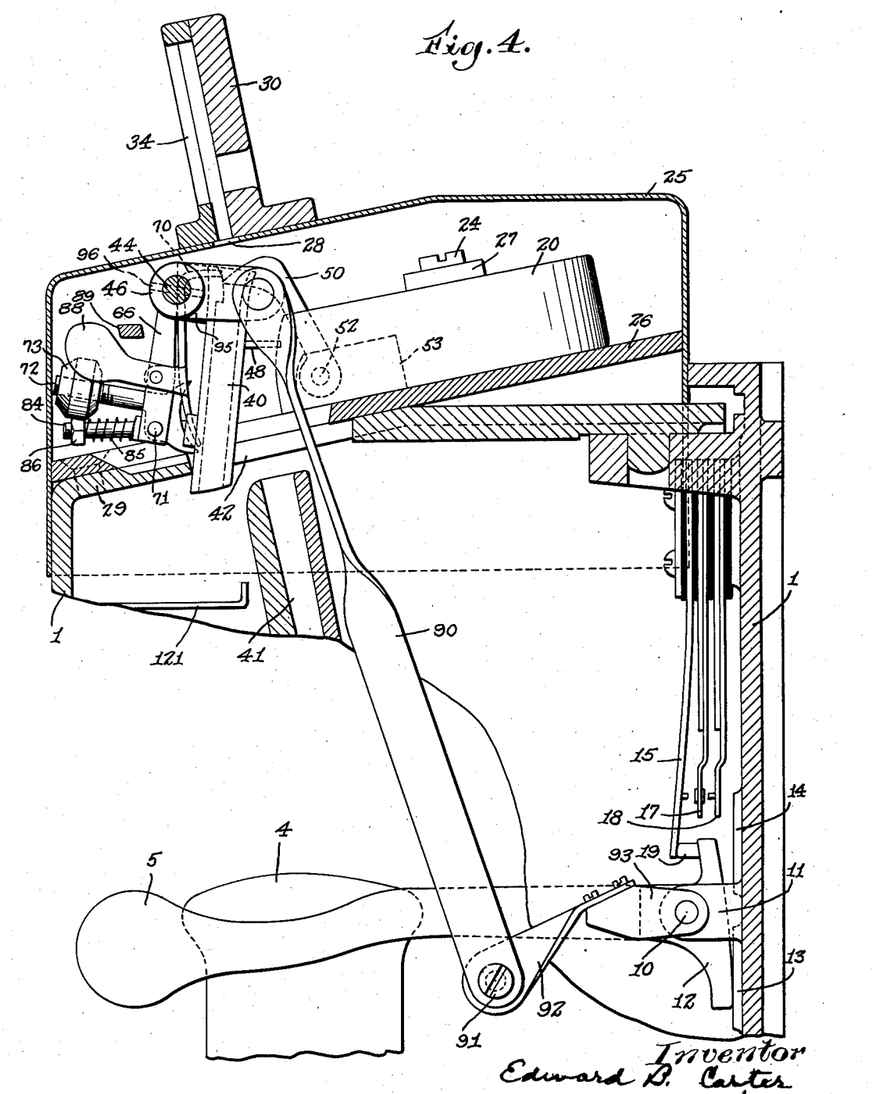
Fig. 4 is a cross-sectional view on the line 4—4 of Fig. 3 showing the position of my testing apparatus at rest and with a telephone receiver on the hook.

If a user has intentionally used the spurious coin, he will be unable to secure a call to the central station as the coin will be withheld from the chute 41, and the guard 78 will prevent a second coin being put in; or should a wire or other instrument be forced in to try to force the spurious coin 61, this would be prevented. Thereupon the user will hang up the receiver on the hook 5, which at once through the link 90 and its connections will rock the arm 44, swinging the tube 40 out of alignment with the chute 41, said tube preferably being of a suitable length to extend within a slot 42 in the top of the casing 1 and will be so rocked until it strikes against the wall of the slot 42 to the left, viewed in Figs. 4, 8, 9, and 11. Thereupon, all further and continued rocking of the arm 44 will cause the web 66, which is keyed to said arm 44, to swing; still further moving the tripping point 79 of the lever 70 and the points 76 and 75 entirely out of the tube 40 against the tension of the spring 85, thus releasing the spurious coin within the tube 40 and permitting it to drop into the return receptacle 120, or, if desired, into a collecting chute, tray, or box 121, as shown in Fig. 4.

If the user unintentionally put in a wrong coin he will, upon receiving no answer from the central operator, eventually replace the receiver 4 on the hook 5, and thereupon the coin is returned to him through the return receptacle 120. He will then see his mistake and appreciate that it is entirely his fault that he has been unable to get the central office and not through inefficiency of the telephone service.

Furthermore, my devices which prevent spurious coins from getting into the telephone instrument and choking and blocking the same, which prevents succeeding users from trying to use the phone and losing their coins, thus tend to discharge each spurious coin and keep the telephone in condition for constant service through the use of a successive genuine coin. One of the serious difficulties now encountered by the telephone company is to free and repair choked coin boxes which have been improperly used by spurious slugs and the like and which have collected numerous genuine coins thereafter without the user being able to reach the central operator in order to complete his call.

My device automatically clears the detecting devices each time of each spurious coin and thus keeps the coin-operated mechanism free and ready for proper use, which is an important factor in maintaining the good-will of the public toward the telephone service.

In Fig. 13 I have illustrated my coin-detecting unit as constructed directly into a part of the telephone box itself rather than as a separate attachment for existing telephones, as shown in Fig. 1.

In this form, my unit would have the several tubes 40, 40 under the coin-receiving plate 30 and in alignment with corresponding tubes 41, 41 which would be so positioned as to permit the genuine coins, once they are passed through the tubes 40 and into the chutes 41, to strike the gongs 101 and 102 and on into the receiving receptacle 103, or in any standard manner if desired.

In Fig. 14 I have illustrated a modified form of the invention wherein the trigger member 110 mounted on the web 66 carries both the locking lever 116 with its part 117 to extend across the top of the tube 40, and with a tripping point 112 formed integral therewith, a weight 111 being mounted on the member 110 as shown and in position to catch and engage a spurious coin 115 either individually or in cooperation with the action of the magnet 20, as already described.

Figures 16, 17:
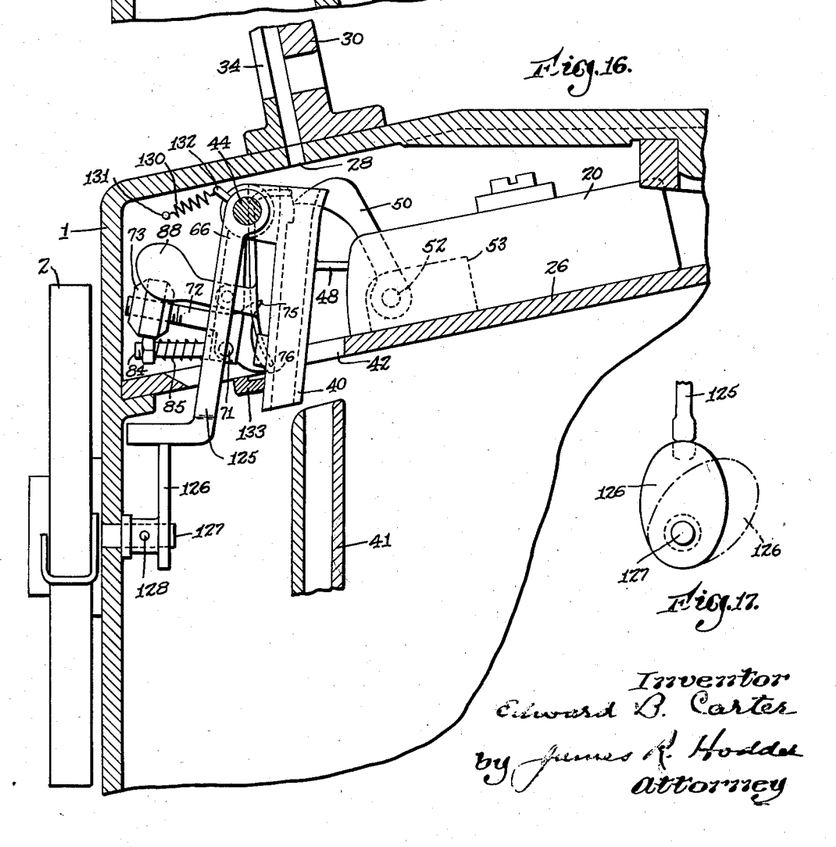
Fig. 16 is a view in cross-section illustrating my device arranged for actuation during the dialing operation.
Fig. 17 is a fragmentary view showing the cam attached to the center shaft of the dial for actuation of my device.

A further modification is illustrated in Fig. 16 wherein the action of swinging the tube 40 into and out of alignment for receiving, passing of genuine coins, and holding spurious coins, and then moving out of alignment and discharging same is effected by the operation of the dial 2 instead of removing and replacing of the receiver 4. In this form I attach to the rocker arm 44 a lever 125 extending downwardly and in position to be moved by a cam 126 secured on the inner end 127 of the shaft carrying the dial 2, a set screw 128 holding same in desired and adjusted position. To the top of the lever 125 I secure a coiled spring 130 attached at 131 to the casing and at the other end to a post 132 secured to the lever 125.

As the dial 2 is oscillated to call a number, the cam 126 will be rocked, lifting the lever 125 against the tension of the spring 130 and, consequently, swinging the chute 40 into non-aligning position as shown in Fig. 16. As but a slight movement is necessary, I have added a stop 133 against which the lower end of the tube 40 may strike so as to amply clear the chute 41 when a spurious coin held within the tube 40 is thus swung out of alignment. When the cam 126 is moved downwardly, the spring 130 pulls the tube 40 and the detecting devices into aligning position and the way in which the same is hung from the rocker arm 44 and the weight of the detecting devices also aid in this swinging action, as will be appreciated.

Thus, it will be appreciated that my coin-detecting devices are specially designed and intended for such service as is required in telephone coin-operated instruments or coin-admission turnstiles and that these devices, while delicate, efficient and compact, are also extremely simple, practical, and inexpensive and have the highly important capacity for instantaneous action both to pass a genuine coin therethrough and to detect, catch, hold, and throw out a spurious coin.

In Fig. 15 I have illustrated how a wire or rod 100 would be prevented from reaching the tube 41 or damaging the mechanism.

Furthermore, my apparatus operates automatically and is also automatic in throwing out successive spurious coins or slugs, and thus prevents all clogging either of the coin-detecting mechanism itself or of the apparatus to which it is attached.

The novel feature of closing the testing mechanism either while a good coin is passing through or while a spurious one is being caught and held is also most important in insuring continuous operation, and preventing clogging, injury or damage.

In the attached claims, the false coins referred to are coins, slugs or the like which have the characteristics of being too light or too thick for their respective sizes, of being made of relatively soft material, of being perforated, or of being magnetic, and the testing means referred to is the means for testing and detecting such coins, slugs or the like.

I claim:

1. Coin testing and selecting apparatus comprising a movable testing member through which the coins to be tested pass, a channel for the reception of false coins with which said member is normally in alignment, a second channel for the reception of legitimate coins, means for moving said member out of alignment with said first mentioned channel and into alignment with said second channel, and means for testing a coin following its entrance into said member, said testing means having holding means for permitting a legitimate coin to pass through said member into said second channel and for retaining a false coin in said member when said second channel and said member are in alignment and having means for releasing said holding means when said member and said first mentioned channel are in alignment.

2. Coin testing and selecting apparatus comprising a movable testing member through which the coins to be tested pass, a channel for the reception of false coins normally in alignment with said member, a second channel for the reception of legitimate coins, means for testing a coin following its entrance into said member, said testing means having holding means for retaining a false coin in said member and for permitting a legitimate coin to pass through said member, movable means capable of adjustment from one position to a second position, and means operated by said movable means upon adjustment from said one position to said second position for moving said member out of alignment with said first mentioned channel and into alignment with said second channel and upon adjustment from said second position to said one position for moving said member back into alignment with said first mentioned channel and for releasing said holding means.

3. In combination, a device to be placed in operation upon the deposit of a coin, a receptacle for receiving a deposited coin, means movable by a person in the normal process of operating said device, a first channel in said device for routing legitimate coins to a point of collection, a second channel for routing false coins to be rejected, a movable chute between said receptacle and said second channel normally in alignment with said second channel, means actuated by said first mentioned means for placing said chute in alignment with said first mentioned channel, and means for testing a coin following its entrance into said chute, said testing means having holding means for permitting a legitimate coin to pass from said chute into said first channel and for holding a false coin in said chute when said chute and said first channel are in alignment and having means for releasing said holding means when said chute and said second channel are in alignment.

4. In combination, a coin operated telephone, a member movable in the normal process of initiating a call by a person desiring to use said telephone, a first channel in said telephone for the disposal of legitimate coins deposited therein, a second channel for the reception of false coins, a movable testing chute normally in alignment with said second channel, means for testing a coin following its entrance into said chute, said testing means having holding means for holding a false coin and for permitting the passage through said chute of a legitimate coin when said chute and said first channel are in alignment and having means for releasing said holding means when said chute and said second channel are in alignment, means operated through movement of said member for placing said chute in alignment with said first channel, and means for closing said chute against entrance of a coin when said chute is in alignment with said second channel.

5. In combination, a coin operated telephone, a member movable in the normal process of initiating a call by a person desiring to use said telephone, a first channel in said telephone for the disposal of legitimate coins deposited therein, a second channel for the reception of false coins, a movable testing chute normally in alignment with said second channel, means for testing a coin following its entrance into said chute, said testing means having holding means for retaining a false coin and for permitting the passage through said chute of a legitimate coin when said chute and said first channel are in alignment and having means for releasing said holding means when said chute and said second channel are in alignment, means operated through movement of said member for placing said chute in alignment with said first channel, and means forming a part of said testing means for closing said chute when a coin is being held in said chute by said holding means.

6. In combination, a coin operated telephone, means movable in the normal process of initiating a call by a person desiring to use said telephone, a receptacle for receiving a deposited coin, a channel for the disposal of legitimate coins, a second channel for the reception of false coins, a coin testing and selecting device between said receptacle and said channels for testing coins deposited in said receptacle, directing means forming a part of said device, normally positioned for directing a false coin, leaving said device, to said second channel, and means movable upon movement of said first mentioned means for positioning said directing means for directing a legitimate coin, leaving said device, to said first channel, said device having holding means for retaining a false coin and for permitting the passage of a legitimate coin therethrough when said directing means is positioned for directing a legitimate coin leaving said device to said first channel, and having means for releasing said holding means when said directing means is positioned for directing a false coin leaving said device to said second channel.

7. In combination, a coin operated telephone, means movable in the normal process of initiating a call by a person desiring to use said telephone, a receptacle for receiving a deposited coin, a channel for the disposal of legitimate coins, a second channel for the reception of false coins, a coin testing and selecting device between said receptacle and said channels for testing coins deposited in said receptacle, directing means forming a part of said device, normally positioned for directing a false coin leaving said device, to said second channel, and means movable upon one movement of said first mentioned means for positioning said directing means for directing a legitimate coin, leaving said device, to said first channel, and movable upon another movement of said first mentioned means for returning said directing means to its normal position, said device having holding means for retaining a false coin and for permitting the passage of a legitimate coin therethrough when said directing means is positioned for directing a legitimate coin leaving said device to said first channel, and having means for releasing said holding means when said directing means is positioned for directing a false coin leaving said device to said second channel.

8. In combination, a coin operated telephone, a receiver, a support upon which said receiver is normally placed, a receptacle for the deposit of a coin, a channel for the disposal of legitimate coins, a second channel for the reception of false coins, a coin testing and selecting device between said receptacle and said channels for testing coins deposited in said receptacle, said device having holding means for retaining a false coin and for permitting the passage of a legitimate coin, directing means forming a part of said device for directing coins to one or the other of said channels, and means movable upon upward movement of said support as by the removal of said receiver therefrom for positioning said directing means for directing legitimate coins leaving said device to said first mentioned channel and movable upon downward movement of said support as by replacement of said receiver thereupon for positioning said directing means for directing a false coin from said device to said second channel and releasing said holding means.

9. In combination, a coin operated telephone, a receiver, a support upon which said receiver is normally placed, a receptacle for the deposit of a coin, a channel for the disposal of legitimate coins, a second channel for the reception of false coins, a coin testing and selecting device between said receptacle and said channels, said device having means for holding a false coin and for permitting the passage of a legitimate coin, directing means forming a part of said device, normally positioned for directing a false coin leaving said device to said second channel, and means movable upon upward movement of said support as by removal of said receiver therefrom for positioning said directing means for directing a legitimate coin leaving said device to said first mentioned channel and for rendering said device operative to test and select and movable upon downward movement of said support as by replacement of said receiver thereupon for positioning said directing means for directing a false coin from said device to said second channel and releasing said holding means.

10. In combination, a coin operated telephone, a receiver, a support upon which said receiver is normally placed, a receptacle for the deposit of a coin, a channel for the disposal of legitimate coins, a second channel for the reception of false coins, a coin testing and selecting device between said receptacle and said channels, said device having means for holding a false coin and for permitting the passage of a legitimate coin, directing means forming a part of said device, normally positioned for directing a false coin leaving said device, to said second channel, means movable upon upward movement of said support as by removal of said receiver therefrom for positioning said directing means for directing a legitimate coin leaving said device to said first mentioned channel and for rendering said device operative to test and select, and movable upon downward movement of said support as by replacement of said receiver thereupon for positioning said directing means for directing a false coin from said device to said second channel and releasing said holding means, and means forming a part of said testing device for closing the entrance to said device when a coin is being tested or held in said device.

EDWARD B. CARTER.